United States Patent
Michiels et al.

(10) Patent No.: US 8,543,835 B2
(45) Date of Patent: Sep. 24, 2013

(54) TAMPER RESISTANCE OF A DIGITAL DATA PROCESSING UNIT

(75) Inventors: Wilhelmus Petrus Adrianus Johannus Michiels, Eindhoven (NL); Paulus Mathias Hubertus Mechtildis Antonius Gorissen, Eindhoven (NL)

(73) Assignee: Irdeto B.V. (NL)

( * ) Notice: Subject to any disclaimer, the term of this patent is extended or adjusted under 35 U.S.C. 154(b) by 362 days.

(21) Appl. No.: 12/307,931

(22) PCT Filed: Jun. 27, 2007

(86) PCT No.: PCT/IB2007/052496
§ 371 (c)(1),
(2), (4) Date: Jan. 8, 2009

(87) PCT Pub. No.: WO2008/010119
PCT Pub. Date: Jan. 24, 2008

(65) Prior Publication Data
US 2009/0254759 A1    Oct. 8, 2009

(30) Foreign Application Priority Data
Jul. 12, 2006 (EP) .................................. 06117041

(51) Int. Cl.
*G06F 21/00* (2013.01)
(52) U.S. Cl.
USPC ............... 713/189; 726/1; 726/36; 713/190; 713/192; 717/168; 717/169; 717/170; 717/171; 717/172; 717/173

(58) Field of Classification Search
USPC .................... 713/189; 726/26; 345/601, 602
See application file for complete search history.

(56) References Cited

U.S. PATENT DOCUMENTS 7,162,642 B2 * 1/2007 Schumann et al. ........... 713/189
7,191,342 B1 * 3/2007 New et al. ..................... 713/190
(Continued)

FOREIGN PATENT DOCUMENTS

JP  H07-312593  11/1995
JP  H10-154976   6/1998
(Continued)

OTHER PUBLICATIONS

Elizabeth Haubert et al, Tamper-Resistant Storage Techniques for Multimedia Systems, 2005.*

(Continued)

*Primary Examiner* — Andy Rao
*Assistant Examiner* — Shan Elahi
(74) *Attorney, Agent, or Firm* — Hayes Soloway P.C.

(57) ABSTRACT

A system for increasing a tamper resistance of a digital data processing unit, comprises a first unit (901) comprising processing means (906) for processing the received digital data in dependence on values looked up in at least one look-up table (916) based on values in the received digital data. The system further comprises a second unit (902) comprising means (912) for computing at least one value for inclusion in the digital data causing the first unit (901) to look up at least one predetermined value in the look-up table (916) when processing the digital data. It comprises an inserter (910) for including the at least one value in the digital data, and an output (908) for transmitting the digital data to the first unit.

17 Claims, 5 Drawing Sheets

(56) References Cited

U.S. PATENT DOCUMENTS

| | | | |
|---|---|---|---|
| 7,243,236 B1* | 7/2007 | Sibert | 713/179 |
| 7,590,866 B2* | 9/2009 | Hurtado et al. | 713/189 |
| 7,681,035 B1* | 3/2010 | Ayars et al. | 713/165 |
| 2004/0139340 A1* | 7/2004 | Johnson et al. | 713/194 |
| 2004/0181671 A1* | 9/2004 | Brundage et al. | 713/176 |
| 2005/0108525 A1* | 5/2005 | Nason et al. | 713/165 |
| 2005/0138392 A1* | 6/2005 | Johnson et al. | 713/186 |
| 2005/0271203 A1 | 12/2005 | Akiyama et al. | |
| 2006/0277240 A1* | 12/2006 | Choo et al. | 708/502 |
| 2007/0022305 A1* | 1/2007 | Ikeda | 713/189 |
| 2008/0215860 A1* | 9/2008 | Jacob et al. | 712/226 |
| 2009/0158051 A1 | 6/2009 | Michiels et al. | |

FOREIGN PATENT DOCUMENTS

| | | |
|---|---|---|
| JP | 2005-331656 | 12/2005 |
| JP | 2006-079347 | 3/2006 |
| JP | 2009-529819 | 8/2009 |
| WO | 9967918 A2 | 12/1999 |
| WO | 2006046187 A1 | 5/2006 |
| WO | 2007105126 A2 | 9/2007 |

OTHER PUBLICATIONS

Mehmet Utku et al, Hierarchial Watermarking for Secure Image Authentication with Localization, Jun. 2002.*

P. Eisen et al, A White-Box DES Implementation for DRM Applicatin, Oct. 2002.*

S Chow et al, White-Box Cryptography and an AES Implementation, Aug. 2002.*

Chow "A White-Box DES Implementation for DRM Application", Oct. 2002.*

Gorissen et al, Mechanishm for Software Tamper Resistance: An Application of White-Box Cryptography, Oct. 2007.*

S. Chow et al: "A White-Box DES Implementation for DRM Applications" ACM CCS-9 Workshop DRM 2002, Digital Rights Management, Washington DC, USA, Nov. 18, 2002, pp. 1-16, XP002471830.

S. Chow et al: White-Box Cryptography and an AES Implementation, 9th Annual International Workshop, SAC 2002, Aug. 15-16, 2002.

Japanese Office Action (English translation only) from a counterpart foreign application, Japanese Appln No. 2009-519016, drafted Sep. 20, 2012, 6 pages.

Hamilton E. Link and William D. Neumann, "Clarifying Obfuscation: Improving the Security of White-Box DES", International Conference on Information Technology: Coding and Computing ITCC2005, (Online), Apr. 4, 2005, vol. 1, p. 679-684, retrieved from the Internet, URL<http://ieeexplore.ieee.org/stamp/stamp.jsp?tp=&arnumber=1428542>.

Julien Bringer, Herve Chabanne, Emmanuelle Dottax, "Perturbing and Protecting a Traceable Block Cipher", Cryptology ePrint Archive: Report 2006/064, (online), Feb. 20, 2006, Version: 20060223:223232, p. 1-12; retrieved from htt;://eprint.iacr.org/2006/064.pdf>.

Oliver Billet, Henri Gilbert, and Charaf Ech-Chatbi, "Cryptanalysis of a White Box AES Implementation", LNCS, Selected Areas in Cryptography, Aug. 2004, Vo.. 3357, pp. 227-240.

* cited by examiner

TAMPER RESISTANCE OF A DIGITAL DATA PROCESSING UNIT

FIELD OF THE INVENTION

The invention relates to increasing a tamper resistance of a digital data processing unit.

BACKGROUND OF THE INVENTION

The Internet provides users with convenient and ubiquitous access to digital content. Because of the potential of the Internet as a powerful distribution channel, many consumer electronics (CE) products strive to directly access the Internet or to interoperate with the PC platform—the predominant portal to the Internet. The CE products include, but are not limited to, digital set top boxes, digital TVs, game consoles, PCs and, increasingly, hand-held devices such as PDAs, mobile phones, and mobile storage and rendering devices, such as Apple's iPod. The use of the Internet as a distribution medium for copyrighted content creates the compelling challenge to secure the interests of the content provider. In particular it is required to warrant the copyrights and business models of the content providers. Increasingly, CE platforms are operated using a processor loaded with suitable software. Such software may include the main part of functionality for rendering (playback) of digital content, such as audio and/or video. Control of the playback software is one way to enforce the interests of the content owner including the terms and conditions under which the content may be used. Where traditionally many CE platforms (with the exception of a PC and PDA) used to be closed, nowadays more and more platforms at least partially are open. In particular for the PC platform, some users may be assumed to have complete control over the hardware and software that provides access to the content and a large amount of time and resources to attack and bypass any content protection mechanisms. As a consequence, content providers must deliver content to legitimate users across a hostile network to a community where not all users or devices can be trusted.

Typically, digital rights management systems use an encryption technique based on block ciphers that process the data stream in blocks using a sequence of encryption/decryption steps, referred to as rounds. During each round, a round-specific function is performed. The round-specific function may be based on a same round function that is executed under control of a round-specific sub-key. For many encryption systems, the round function can be specified using mapping tables or look-up tables. Even if no explicit tables were used, nevertheless frequently tables are used for different parts of the function for efficient execution in software of encryption/decryption functions. The computer code accesses or combines table values into the range value of the function. Instead of distributing keys, that may be user-specific, it becomes more interesting to distribute user specific algorithms instead of keys for encryption or decryption algorithms. These algorithms, most often functions (mappings), have to be obfuscated (hidden) in order to prevent redesign or prohibit the re-computation of elements that are key-like. On computers, tables accompanied with some computer code often represent these functions.

Content providers must deliver content to legitimate users across a hostile network to a community where not all users or devices can be trusted. In particular for the PC platform, the user must be assumed to have complete control of the hardware and software that provides access to the content, and an unlimited amount of time and resources to attack and bypass any content protection mechanisms. The software code that enforces the terms and conditions under which the content may be used must not be tampered with. The general approach in digital rights management for protected content distributed to PCs is to encrypt the digital content, for instance DES (Data Encryption Standard), AES (Advanced Encryption Standard), or using the method disclosed in WO9967918, and to use decryption keys.

The two main areas of vulnerability of digital rights management relying on encryption are the software plug-ins which enforce the terms and conditions under which the content may be used, and the key distribution and handling.

Typically, the plug-in enforces the terms and conditions under which the content is to be used. An attacker aiming to remove these terms and conditions may attempt to achieve this through tampering of the program code comprised in the software plug-in.

In relation to key handling, for playback a media player has to retrieve a decryption key from a license database. It then has to store this decryption key somewhere in memory for the decryption of the encrypted content. This leaves an attacker two options for an attack on the key. Firstly, reverse engineering of the license database access function could result in black box software (i.e., the attacker does not have to understand the internal workings of the software function), allowing the attacker to retrieve asset keys from all license databases. Secondly, by observation of the accesses to memory during content decryption, it is possible to retrieve the asset key. In both cases the key is considered to be compromised.

Tamper-resistant software is so called because goal-directed tampering with the software is complicated. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the application, and consequently to change it.

"White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1", and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2", disclose methods with the intend to hide the key by a combination of encoding its tables with random bijections representing compositions rather than individual steps, and extending the cryptographic boundary by pushing it out further into the containing application.

WO 2006/046187 discloses how in a system, a server provides a cryptographic function F to an execution device in an obfuscated form. The function F composes output of a plurality of the mapping tables $T_i$ ($0 \leq i \leq n$; $n \geq 1$) using an Abelian group operator $\otimes$. A processor chooses tables O and C such that $C[x] \otimes O[x]=0$, $\forall x \in D_i$ and creates tables $T'_i$, $0 \leq i \leq m$; $n \leq m \leq n+1$, where for $0 \leq i \leq n$, each table $T'_i$ represents the respective corresponding table $T_i$ and at least one table $T'_{o_1}$, $0 \leq o_1 \leq n$, being formed through an Abelian composition of $T_{o_1}$ and O, and at least one table $T'_{c_1}$, $0 \leq c_1 \leq m$, $c_1 \neq o_1$ being formed through an Abelian composition that includes C. Means are used for providing the tables $T'_i$ to the executing device. The executing device includes means for receiving the tables and a processor for forming a function F' that is functionally equivalent to the cryptographic function F by an Abelian composition of the tables T'$_i$.

SUMMARY OF THE INVENTION

It would be advantageous to have an improved system for increasing a tamper resistance of a digital data processing unit. To better address this concern, in a first aspect of the invention a system is presented that comprises:
a first unit (901) comprising:
  an input (904) for receiving the digital data, and
  processing means (906) for processing the received digital data in dependence on values looked up in at least one look-up table (916) based on values in the received digital data; and
a second unit (902) comprising
  means (912) for computing at least one value for inclusion in the digital data causing the first unit to look up at least one predetermined value in the look-up table when processing the digital data,
  an inserter (910) for including the at least one value in the digital data, and
  an output (908) for transmitting the digital data to the first unit.

The processing performed by the first unit may comprise a rendering of the data. The data may comprise encoded audio and/or video content. The first unit comprises one or more look-up tables (916), and the processing of the digital data is performed at least partly by performing a number of table look-ups. In many systems, the data and/or a pseudo-random process determine which look-up table entries are being used for the decoding. On such systems it may happen that certain look-up table entries are not used or only used after having decoded already a relatively large part of the data. This aspect of the invention allows a second unit to specify at least one predetermined value in the look-up table that will be accessed when processing the data. The second unit can specify this by including at least one value in the data, where the at least one value is selected such that it will cause the predetermined value to be accessed and used in the processing. If the predetermined value in the look-up table has been changed by an attacker, the processing fails because successful processing requires the use of the unchanged value.

The first unit may be for example a user terminal, a computer, a set-top box or television. The second unit may be for example a content provider or a server. The first and second unit may also be part of a single physical device.

According to an aspect of the invention, the second unit comprises encryption means for including encrypted content in the digital data; the inserter is arranged for including the at least one value in the encrypted content; and the processing means is arranged for decrypting the encrypted content based on the look-up operations.

Decryption and encryption can be efficiently implemented using look-up tables. By inserting the values in the encrypted content, the decoder will access the predetermined look-up table entries without being able to distinguish the inserted values as such from any other values appearing in the encrypted data. After decrypting, the decrypted data may contain labels identifying the decryption result of the inserted value, which will allow the means for processing to discard the decryption result of the inserted value.

According to an aspect of the invention, the system comprises verification means for comparing an output of the processing means with a reference value.

The verification means may be included in the first unit, the second unit or in a third unit and receives an outcome of the processing. The verification means compares the outcome of the processing with a value that is believed to be the correct outcome. If the predetermined value in the look-up table does not contain the value it should contain, then the comparison fails and the verification unit detects a tampering.

According to an aspect of the invention, the processing means is arranged for processing the digital data in a predetermined order, where the values looked up influence a processing result of data whose processing starts after the look-up operation.

This aspect has the advantage that a relatively large portion of the data will not be processed correctly if the look-up table value has been tampered with. A lot of data after the inserted value will be processed incorrectly in case of such a tampering.

According to an aspect of the invention, the inserter is arranged for positioning the at least one value in the digital data to cause the means for decoding to look up the at least one predetermined value in the look-up table before processing a predetermined block of the digital data.

This is to make sure that the predetermined block of digital content is well protected against being processed on a system that has been tampered with.

According to an aspect of the invention,
the first unit comprises a memory for storing a bit representation of software to be executed by the first unit, and at least part of the bit representation of the software is used as at least part of the look-up table by the processing means; and
the at least one predetermined value in the look-up table occurs in the at least part of the bit representation of the software.

The fact that memory locations are used for two independent purposes makes it more difficult to tamper with the memory location, because if a change is made to achieve a goal related to the first use of the memory location, this change will also affect the second use of the memory location in a way that may be difficult to overcome.

It is noted that co-pending patent application EP06116693.0 (attorney docket PH005600) discloses a method of increasing tamper resistance of a software system, comprising the steps of:
composing a plurality of computer executable instructions for processing digital data based on a plurality of parameters;
identifying in a bit representation of the parameters a part equal to a bit representation of computer executable code that is readable during the processing;
arranging the instructions for, during an execution of the instructions, using at least one memory address holding the bit representation of the code for reading the equal part of the bit representation of the parameters by reference.

According to an aspect of the invention, the at least part of the bit representation of the software contains instructions executed as part of an operation of the processing means.

The instructions executed as part of the processing means as well as the look-up tables are protected by unifying them and storing a single copy in memory. The processing means again may comprise a decryption means, encryption means, or (de)compression means.

BRIEF DESCRIPTION OF THE DRAWINGS

These and other aspects of the invention will be elucidated hereinafter with reference to the drawings, wherein.

DETAILED DESCRIPTION OF EMBODIMENTS

Figure 3:
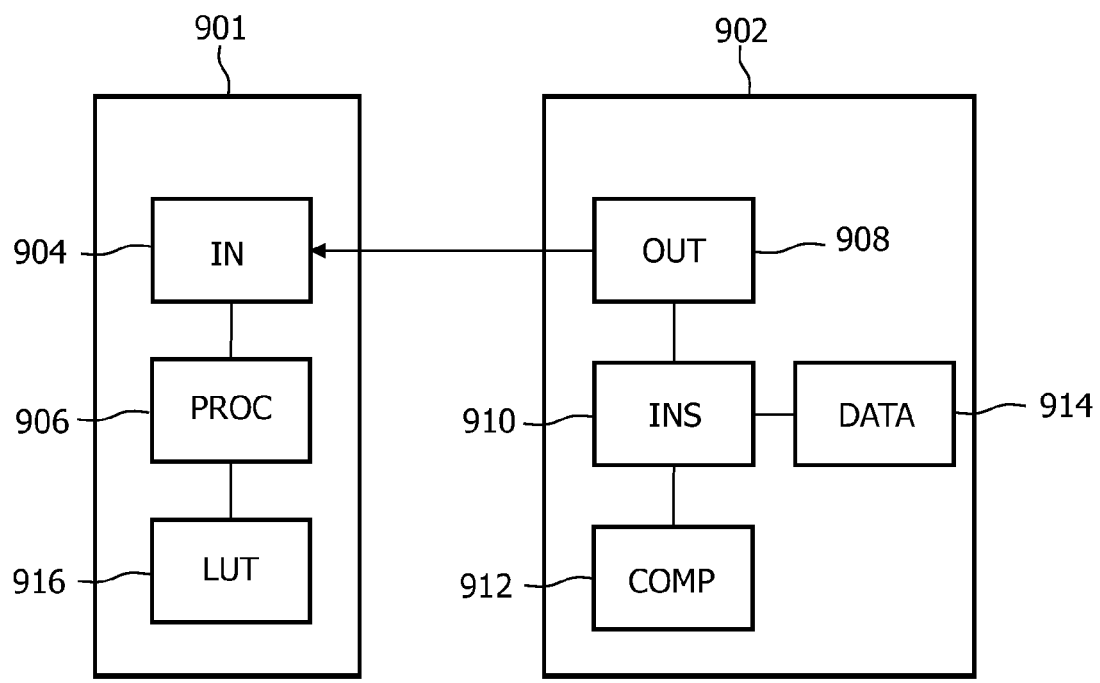
FIG. 3 is a diagram illustrating an embodiment.

FIG. 3 illustrates an embodiment of the invention. The Figure shows a first unit 901 and a second unit 902. The first unit 901 uses input 904 to receive data from the second unit 902 via output 908. Input 904 may comprise a network input with for example TCP/IP support or a unit for reading data from removable storage media (e.g. DVD, CD, tape). Output 908 correspondingly comprises network output or for example disc mastering equipment. The arrow connecting output 908 and input 904 represents the distribution channel for transmitting data from output 908 to input 904. The second unit 902 further comprises a data storage or data generator 914. The data 914 may be encoded in any particular format such as ZIP, MPEG, MP3, and may also be encrypted. The second unit also comprises an inserter 910 for inserting specific values into the data stream. The inserter 910 may have some intelligence built in to make sure that the data including the inserted value is compliant with the format of the original data 914. If the data is generated on the fly, the inserter may cooperate with the data generator to properly accommodate the inserted values in the data format. Also, the inserted values may be labeled such that they can be recognized as such. This is to prevent the first unit to treat the inserted values wrongly. However, the labeling may only become apparent after some processing has been done.

The first unit 901 further comprises a processing means 906 and one or more look-up tables 916. The processing means processes the incoming data. It may interpret the format in which the data is presented (ZIP, MPEG, MP3, encryption, etc). For example ZIP format means the processing comprises decompression. The processing means may also be arranged for decoding MPEG, MP3, or other formats. As a final example, the processing means may be arranged for decrypting or encrypting the incoming data. The processing means 906 performs the processing at least in part by looking up values derived from the data in one of the look-up tables 916. The values looked up may be used for further processing, for example for defining a next table lookup, or they may represent output data. The look-up tables play as such an important role in the processing of the data. If a look-up table entry is changed by an attacker, and that look-up table entry is used in relation to the data, the processing means may produce wrongly processed data. This makes it more difficult for the attacker to make successful changes.

Suppose a party has some interest in the integrity of the first unit 901. That party can use the second unit 902 to verify the integrity of the first unit 901. Of course, the integrity may be checked continuously by look-ups as derived from the input data. However, the second unit 902 can be used to check for the presence of a particular predefined value. To that end, inserter 910 inserts specially computed values into the data stream. The second unit 902 further comprises a means 912 for computing the value for inclusion in the digital data. The value is computed in such a way that the processing means 906 that is part of the first unit 901 will look up the particular predefined value when it is processing the data. To that end, the means 912 for computing the value has some knowledge of the processing means 906 and/or look-up tables 916.

In some cases, the inserted value should not be used in the processed data, as it is included solely to check the look-up table entry. To that end, the inserter 910 may be arranged to include a marker in the data to identify the inserted value. Preferably, the marker only becomes visible after processing the data by processing means 906, because otherwise an attacker might tamper with processing means 906 to skip the inserted value. Additionally, the encoding is usually such that the inserted value also influences some of the data around the inserted value. This will render the data around the inserted value unusable if the look-up table entry has been changed, which is exactly what is desired. Also it is possible that the second unit 902 requires the first unit 901 to return (part of) the processed data to the second unit 902. The second unit 902 may then verify the processed data and thereby find out if the predefined look-up table entry was changed or not.

In the following, it is explained how an implementation of an algorithm can be made more tamper resistant by using obfuscated look-up tables. Also, unification of code with table values is explained. The examples of AES and DES are given. However, the method can be applied to many different kinds of algorithms, especially algorithms that can be implemented using one or more look-up tables.

Obfuscating Look-Up Tables

The approach of adding a veil of randomness and complexity in the control and the data path of the software application does not prevent the software from being subject to tampering, but only makes it more difficult to determine what changes would need to be made in order to achieve the tamperer's aim. General principles behind tamper-resistance can be outlined as follows. A program P can be represented as a composite of access control and/or permissions X and with functionality Y. An attacker may wish to tamper with the program such that the access control or permissions are removed without affecting the functionality. The tampered program could then be run without access controls or permissions at all, or at least run such that these controls are ignored. The invention will be explained mainly for the case that Y comprises a processing functionality. This functionality may include encryption, decryption, compression, decompression, rendering, validation, authentication. The invention applies to any kind of functionality Y.

Ideally, for a tamper-proof program, tampering with X should immediately result in the loss of Y, no matter how small the tampering is. In other words, X and Y should be inseparable, or at least only separable with great difficulty. One way of implementing inseparability would be to create a relationship between X and Y such that any intended alteration to X results in an unintended alteration to Y, which would remove the functionality from Y. In order to reinstate the functionality of Y, a further alteration to Y would be needed. As the functionality and control elements of the program have been made inseparable, an attack becomes much more difficult. If such an inseparability is created over the code of a program, the program may be made tamper-resistant without the need for the program code to necessarily be veiled. Tamper-resistant software is software in which it is complicated to perform goal-directed tampering.

AES is a block cipher with a block size of 128 bits or 16 bytes. The plaintext is divided in blocks of 16 bytes which form the initial state of the encoding algorithm, and the final state of the encoding algorithm is the ciphertext. To conceptually explain AES, the bytes of the state are organized as a matrix of 4×4 bytes. AES consists of a number of rounds. Each round is composed of similar processing steps operating on bytes, rows, or columns of the state matrix, each round using a different round key in these processing steps.

Figure 1:
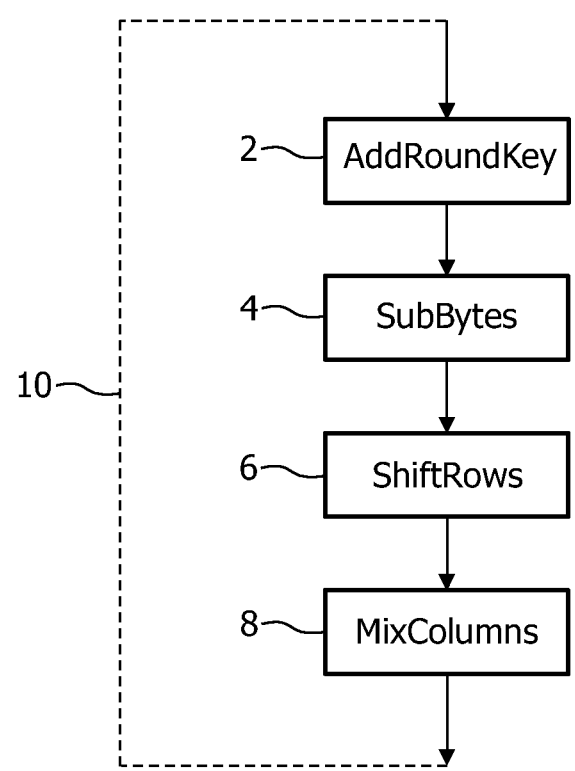
FIG. 1 is a diagram illustrating operations in a round of AES.

FIG. 1 illustrates some main processing steps of a basic round of AES. The processing steps include:

AddRoundKey 2—each byte of the state is XOR'ed with a byte of the round key.

SubBytes 4—A byte-to-byte permutation using a lookup table.

ShiftRows 6—Each row of the state is rotated a fixed number of bytes.

MixColumns 8—Each column is processed using a modulo multiplication in $GF(2^8)$.

The steps SubBytes 4, ShiftRows 6, and MixColumns 8 are independent of the particular key used. The key is applied in the step AddRoundKey 2. Except for the step ShiftRows 6, the processing steps can be performed on each column of the 4×4 state matrix without knowledge of the other columns. Therefore, they can be regarded as 32-bit operations as each column consists of 4 8-bit values. Dashed line 10 indicates that the process is repeated until the required number of rounds has been performed.

Each of these steps or a combination of steps may be represented by a lookup table or by a network of lookup tables (S-boxes). It is also possible to replace a full round of AES by a network of lookup tables. For example, the AddRoundKey step can be implemented by simply XOR'ing with the round key, while the SubBytes, ShiftRows, and MixColumns steps are implemented using table lookups. However, this means that the key is still visible to the attacker in the white-box attack context. The AddRoundKey step can also be embedded in the lookup tables, which makes it less obvious to find out the key. The order of steps 2, 4, 6, and 8 as shown is usually used for encryption. For decryption, the steps are performed in the reverse order. However, it is possible to restate the decryption process such that it uses the order of steps 2, 4, 6, and 8 as shown in the Figure.

Figure 2:
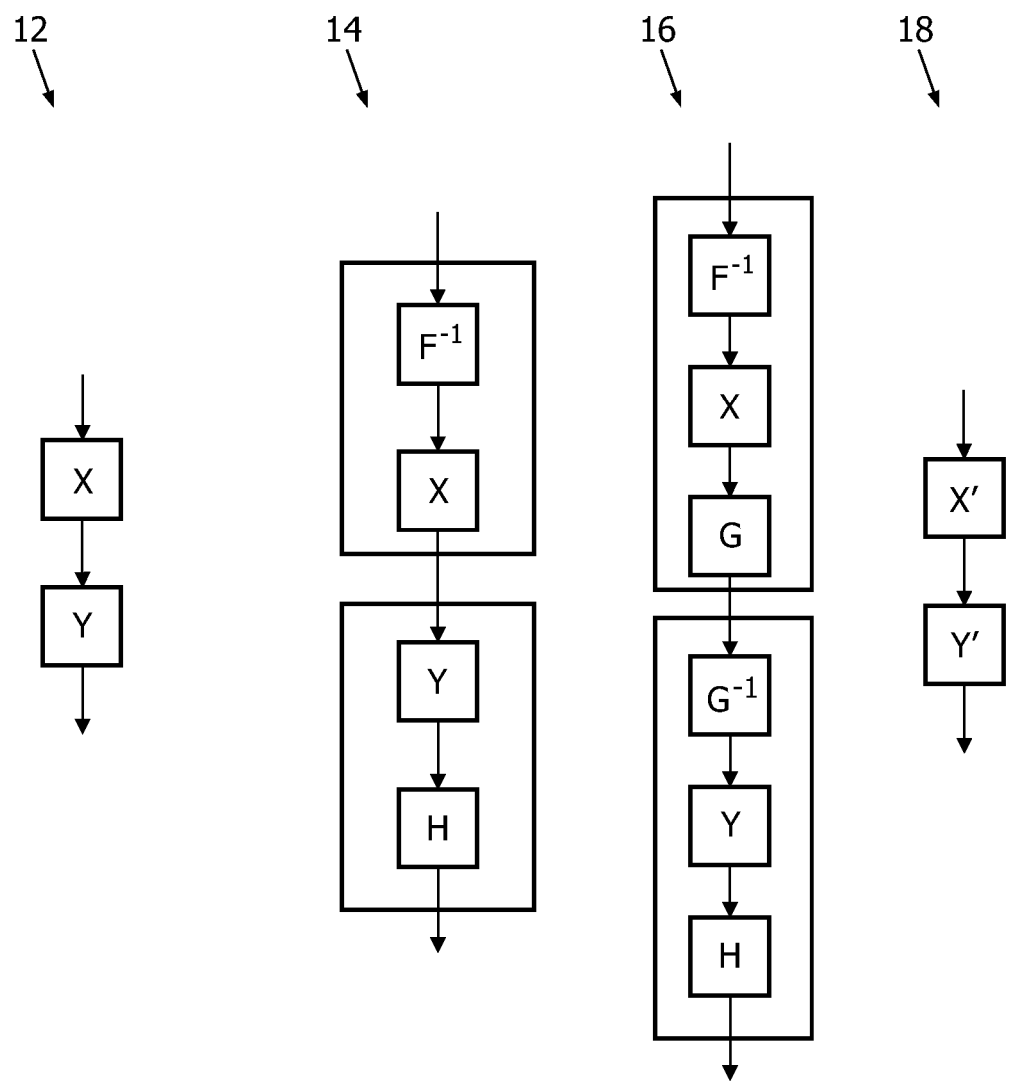
FIG. 2 is a diagram illustrating an example of obfuscating tables.

FIG. 2 illustrates a way to make it even more difficult to extract the key. Let X and Y be two functions. Consider an operation $Y \circ X(c) = Y(X(c))$, illustrated as diagram 12, where c is an input value, for example a 4-byte state column. However, the approach applies to any type of input value c. Mappings X and Y can be implemented as look-up tables which can be stored in memory, however, when they are stored in memory the values can be read by an attacker. Diagram 14 illustrates how the contents of the look-up tables can be obfuscated by using an input encoding F and an output encoding H. Look-up tables corresponding to $X \circ F^{-1}$ and $H \circ Y$ are stored as illustrated instead of X and Y, making it more difficult to extract X and Y. Diagram 16 shows how to add an additional, for example random, bijective function G, such that the intermediate result of the two tables is also encoded. In this case, two tables are stored in memory: $X' = G \circ X \circ F^{-1}$ and $Y' = H \circ Y \circ G^{-1}$. This is illustrated once more in diagram 18:

$$Y' \circ X' = (H \circ Y \circ G^{-1}) \circ (G \circ X \circ F^{-1}) = H \circ (Y \circ X) \circ F^{-1},$$

where $\circ$ denotes function composition as usual (i.e., for any two functions f(x) and g(x), $f \circ g(x) = f(g(x))$ by definition), X and Y are functions suitable for implementation by means of look-up tables. Likewise a network consisting of more than two functions can be encoded. The actual tables encoding X and Y are obfuscated by combining $H \circ Y \circ G^{-1}$ in a single look-up table and combining $G \circ X \circ F^{-1}$ in a single look-up table. As long as F, G, and/or H remain unknown, the attacker cannot extract information about X and/or Y from the look-up tables, and hence the attacker cannot extract the key that is the basis for X and/or Y. Other cryptographic algorithms, including DES and Rijndael (of which AES is a particular instantiation), may also be encoded as a (cascade or network of) look-up tables that may be obfuscated in a way similar to the above. The invention is not limited to the exemplary cryptographic algorithms mentioned.

Chow 1 discloses a method with the intent to hide the key by encoding its tables with random bijections representing compositions rather than individual steps. Preventing secret-key extraction has the advantage that an attacker is prevented from extracting keying material which would allow software protection goals to be bypassed on other machines, or from publishing keying material effectively creating 'global cracks' which defeat security measures across large user-bases of installed software. It provides an increased degree of protection given the constraints of a software-only solution and the hostile-host reality. In the approach of Chow 1, the key is hidden by (1) using tables for compositions rather than individual steps; (2) encoding these tables with random bijections; and (3) extending the cryptographic boundary beyond the crypto algorithm itself further out into the containing application, forcing attackers (reverse engineers) to understand significantly larger code segments to achieve their goals. Chow 1 discusses a fixed key approach: the key(s) are embedded in the implementation by partial evaluation with respect to the key(s), so that key input is unnecessary. Partial evaluation means that expressions involving the key are evaluated as much as reasonably possible, and the result is put in the code rather than the full expressions. The attacker could extract a key-specific implementation and use it instead of the key, however cryptography is typically a component of a larger containing system that can provide the input to the cryptographic component in a manipulated or encoded form, for which the component is designed, but which an adversary will find difficult to remove. Referring to the step of encoding tables, since encodings are arbitrary, results are meaningful only if the output encoding of one step matches the input encoding of the next. For example, if step X is followed by step Y (resulting in computation of $Y \circ X$), the computation could be encoded as $$Y' \circ X' = (H \circ Y \circ G^{-1}) \circ (G \circ X \circ F^{-1}) = H \circ (Y \circ X) \circ F^{-1}.$$

This way, $Y \circ X$ is properly computed albeit that the input needs to be encoded with F and the output needs to be decoded with $H^{-1}$. The steps are separately represented as tables corresponding to Y' and X', so that F, G, and H are hidden as well as X and Y. Apart from such confusion steps, Chow 1 uses diffusion steps by means of linear (bijective) transformations to further disguise the underlying operations. The term mixing bijection is used to describe such a linear transformation. The implementation of Chow 1 takes input in a manipulated form, and produces output in a differently manipulated form, thereby making the white-box attack context (WBAC) resistant AES difficult to separate from its containing application.

Chow 2 discusses a cryptographic implementation of DES designed to withstand the white-box attack context with the objective to prevent the extraction of secret keys from the program. The techniques discussed in this paper about obfuscating look-up table networks applies for a large part also to other cryptographic algorithm including AES and others. While an attacker controlling the execution environment can clearly make use of the software itself (e.g. for decryption) without explicitly extracting the key, forcing an attacker to use the installed instance at hand is often of value to digital rights management (DRM) systems providers. In general, the approach in Chow 2 is to work towards an implementation consisting entirely of substitution boxes, none of which implement affine transformations. A number of techniques are described in Chow 2 that are needed to support the general approach. Some of these techniques are I/O-blocked encoding, combined function encoding, by-pass encoding, split-path encoding, and output splitting.

Partial evaluation means that expressions based on values (partially) known at the time of implementation are pre-evaluated. In a simplified example, when the key is '5', and the original implementation contains the expression '2*key', then rather than incorporating '2*5' in the implementation, the pre-evaluated expression '10' is put in the implementation. This way, the key '5' is not directly present in the code. In the case of DES with a fixed key, this involves replacing standard S-boxes (computed from the key at run-time) with key-specific pre-evaluated S-boxes (computed from the key at or before compilation time). A mixing bijection according to Chow 2 is a bijective affine transformation designed such that each output bit depends on a large number of input bits. I/O-blocked encoding is an encoding method for handling large numbers of input and output bits. In this case, the encoding/decoding can be formed as a concatenation of encodings, where each encoding deals with a subset of the input/output bits. Combined function encoding means that if two or more operations can be processed in parallel, a single encoding function is applied to the concatenation of the inputs (respectively outputs) of the parallel operations. It is more or less the opposite of I/O-blocked encoding. By-pass encoding means that the encoding transformation adds a number of superfluous bits of entropy to the input and/or output of the transform to be obfuscated, and redesign the transform to be obfuscated to "by-pass" the superfluous bits such that they do not effect the final output of the procedure. Split-path encoding means that a function is modified to provide additional output bits for obfuscating the essential information bits. Output splitting means that the output of a function is distributed over several partial functions, where the output of all partial functions must be combined in a non-obvious way in order to obtain the original output of the function.

Chow 2 proposes building encoded networks to construct S-boxes with wide input of, say, 32 bits or even 96 bits. Such a wide-input S-box representing an affine transformation is divided into a network of S-boxes each having a more narrow input and output; each of the S-boxes is encoded by incorporating an encoding function in the S-box. The inverse of the encoding function is incorporated in the S-box processing the output of the S-box.

Unifying Code with Look-Up Table Values

In an aspect of the invention, a method for enabling tamper-resistant distribution of digital data is provided. The data needs to be processed by computer code comprising instructions available to a receiver of the digital data. Purpose of the processing may be a rendering of audio/video signals represented by the data. The processing may comprise encrypting, decrypting, compression, decompression, or other processing. The method comprises composing a plurality of instructions comprising an implementation of a processing algorithm for processing the digital data. The plurality of instructions form a computer program, for example a plug-in or media player needed on a user terminal for successful playback of the distributed content. The processing algorithm is based on parameters. In case of decryption, the parameters may represent a cryptographic key. The distributed data may be (partly) encrypted using a corresponding encryption key.

A part of the parameters is identified that is equal to a part of the processor instructions. More particularly, a part of a bit representation of the parameters is equal to a part of a bit representation of the instructions. A remaining part of the parameters may be different from any processor instructions. The identified parameters may be equal to the processor instructions contained in the implementation of the processing algorithm. However, the identified parameters may also be equal to a bit representation of processor instructions appearing elsewhere in the system. For example, they may be equal to some particular string of bits appearing in the kernel of the operating system, or bits appearing in some driver of the system such as a TCP/IP communication stack.

The processor instructions are arranged such, that during execution the equal part of the parameters is read (for example for use in the decryption process) by referencing a memory location of the part of the bit representation of the processor instructions. The equal part of the parameters is not stored separately in memory, as the required bit representation is already present at the memory addresses holding the coinciding processor instructions. Effectively a same memory address is used in two ways: as a storage location of a parameter to a decryption algorithm, and at the same time as a storage location for a processor instruction to be executed. Typically the instruction reading the memory location as a parameter is itself stored at a different memory location, and accesses the memory location holding the parameter by reference. The instructions form program code. The instructions are compliant with the execution environment where the program code is executed. For example they are processor instructions or pseudo code instructions such as virtual machine instructions (e.g. java bytecode).

In another aspect of the invention, the parameters are chosen such that they contain a relatively large equal part. A single memory address may hold data that can be used in two seemingly unrelated ways: as a processor instruction and as a parameter value. This has the effect that if an attacker changes the processor instruction, the parameters may become invalid, and vice versa, if an attacker changes the parameters, the processor instruction becomes invalid. It may thus become more difficult for an attacker to perform goal directed tampering.

Figure 4:
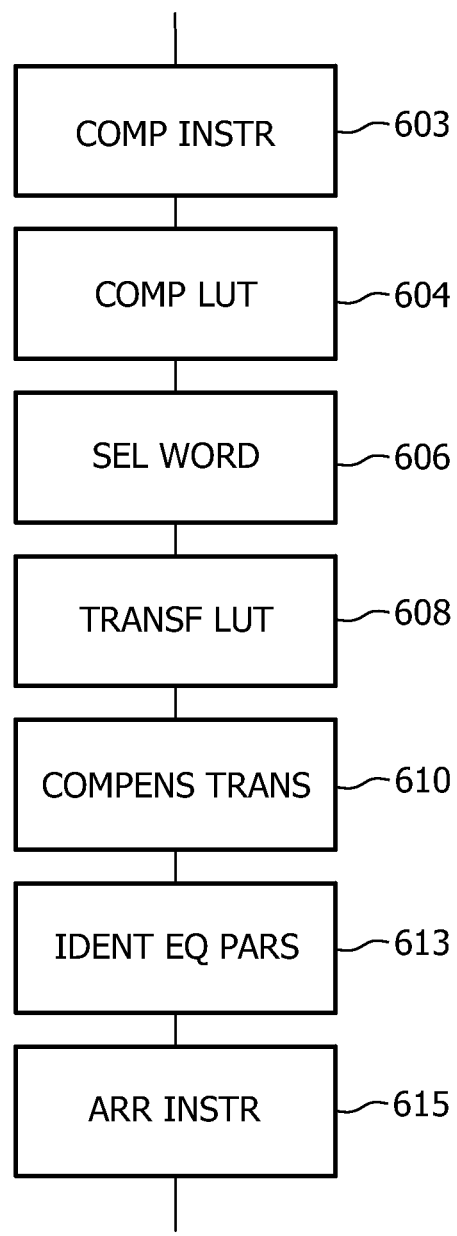
FIG. 4 is a flowchart illustrating processing steps.

FIG. 4 shows the steps of composing an implementation 603, identifying a coinciding part of the parameters 613, and arranging the implementation 615. The parameters may include one or more look-up tables, for example forming a network of look-up tables. Such a network of look-up tables can be computed (step 604) for example from a cryptographic key. A word of the bit representation of the processor instructions is selected (in step 606) for inclusion in at least one of the look-up tables in the network. The inclusion of the word is realized by applying (in step 608) a transformation to elements of the look-up table. This transformation is compensated for by applying (in step 610) a compensating transformation inverting an effect of the transformation to elements of at least one of the other look-up tables. Usually the at least two transformed look-up tables are connected via the network of look-up tables. The transformed network of look-up tables are used as the parameters of the cryptographic algorithm rather than the original network of look-up tables.

An embodiment comprises selecting a plurality of words of the bit representation of the instructions and creating a look-up table that contains this bit representation of the instructions to form a 'code-containing' look-up table. The code-containing look-up table is included in a network of look-up tables forming parameters to a data processing program. Usually the effect of the code-containing look-up table is compensated for by including properly chosen look-up tables in the network of look-up tables. The instructions forming the program code are arranged such that the memory addresses holding the instructions appearing in the code-containing look-up table are also used for reading the values of the code-containing look-up table.

Enforced Table Look-Ups

In an embodiment, returning to FIG. 3, the second unit 902 comprises encryption means for including encrypted content in the digital data 914. The inserter 910 includes the computed value in the encrypted data stream for decryption by processing means 906. Processing means 906 comprises decryption means for decrypting the encrypted content including the inserted values. The decryption means uses the look-up tables 916 in one of the ways set forth. Preferably a white box implementation of a decryption algorithm is used. This could be the AES or DES implementations similar to Chow 1 and Chow 2, however, any other implementation or decryption scheme is equally usable.

In an embodiment, the processing means is arranged for decoding the digital data in a predetermined order. Data is processed in dependence on earlier processed data. One of the possibilities to implement this is in an encryption method. It applies for example to streaming ciphers. It also applies to decoding schemes using a cipher-block-chaining (CBC) mode in which a dependency is created with the plaintext instead of (or in addition to) the ciphertext.

The inserter may be arranged to position the value that tests the predefined look-up table entry before an important block of data, so that a positive result of the test is required for proper processing of the important block of data. For example, a series of values, each testing a different predetermined look-up table entry, are inserted at the beginning of a data stream. This way, a change to any of the tested entries renders the complete data stream unusable.

Unification of key and code in memory may be done for increasing the tamper resistance. The data to be processed in general determines which look-up table entries will be used in the processing. So even after tampering with the code, it could happen that a relatively large portion of the processing is performed successfully because the tampered memory values are not needed for processing the data. For example, if one byte is changed in an 8-bit to k-bit look-up table (for any k>0), and only one 8-bit value is needed for processing a block of code, and each of the 256 8-bit values have equal probability of occurring, then the probability that the changed byte is used in the processing, is 1/256, or 0.4%. It would be desirable to increase this probability, i.e., to increase the probability that the processing will fail and/or to ensure that the processing fails for a larger part of the data after a change of one or more bytes of the code. It will be appreciated that it may also be desirable to access predefined look-up table entries that are not unified with code but that may have some other special meaning. Also if it is suspected that a certain value may have been changed, it would be desirable to check that value.

Let X be a (possibly empty) stream of data blocks that has to be processed (for example encrypted or decrypted) by a white-box implementation. It is possible to insert in X a number of blocks $B_1, B_2, \ldots, B_m$, that are chosen in such a way that they access particular look-up table entries (i.e., particular parts of the key) in the white-box implementation. It is also possible to precede X by the blocks $B_1, B_2, \ldots, B_m$.

An approach to increase the probability that the processing fails for a larger part of the data after a change of one or more bytes of the code is the following. A block cipher mode can be chosen in which an incorrect decryption propagates through the further decryptions. In comparison, in the "electronic cookbook" (ECB) mode in which each ciphertext block can be decrypted independent of the other ciphertext blocks, each block has an independent probability (0.4% in the example above) of accessing a tampered look-up table entry. The incorrect decryption can be made to propagate further to the next decryptions, for example by making the decryption process of a block dependent on the decryption result of the block decrypted previously. After the first block of data for which the decryption result is wrong, all following blocks will also be decrypted wrongly. This makes that a much larger portion of the data cannot be processed correctly if the tested portion of the code has been tampered with.

In an embodiment, a white-box implementation is used in some kind of a mode that propagates an error (for the reason discussed above). For instance, the variant of the cipher-block-chaining (CBC) mode is used in which a dependency is created with the plaintext instead of the ciphertext. For example, in the "normal" CBC mode, a data block i is encrypted after XOR-ing it with the encrypted data block i−1. In the "proposed" variant, a data block i is encrypted after XOR-ing it with the unencrypted (plaintext) data block i−1. The "normal" CBC mode makes the data stream more random. The "proposed" variant makes that a single decryption error is propagated to all subsequent data blocks. A stream S with content to be encrypted is preceded by a number of blocks that aim for accessing specific look-up table entries, in particular the entries containing code. If one or more bits in the unified code are changed, then none of the blocks of S will be decrypted correctly. It is also possible to combine the "normal" CBC mode with the "proposed" CBC mode by creating a dependency (e.g. XOR-ing) with both the plaintext and the ciphertext of a previous block. This way, the possible advantages of both modes (randomness and error propagation) are combined.

Data blocks can be computed such that a particular look-up table entry is accessed during the decryption process (or during the encryption process, as applicable). Consider a standard (non-white-box) implementation of an AES decryption (or encryption) algorithm using look-up tables. Furthermore, consider the following problem for this implementation: Given is a round r and an input $I_r$ to this round. Find an input $I_1$ to the first round of the decryption algorithm, such that the input to round r is $I_r$. It will be apparent that with a solution for this problem, a skilled person is able to design data blocks such that particular look-up table entries are accessed by a predefined non-white-box implementation of a decryption algorithm. Let $f_i$ be the function computed in round i of standard (non-white-box) AES, i.e., $f_i(I_i)$ is the output of round i if its input is given by $I_i$. It is easy to compute the inverse $f_i^{-1}$ of a round $f_i$ because all steps in the computation of $f_i$ (AddRoundKey, SubBytes, ShiftRows, MixColumns) are easily invertible. As a result, $I_1$ can be computed as $I_1 = f_1^{-1} \circ f_2^{-1} \circ \ldots \circ f_{r-1}^{-1}(I_r)$.

This algorithm can be modified to derive a data block that enforces a white-box decryption algorithm to access a particular row l in, for example, a Type II table T. The modified algorithm starts with deriving an (encoded) input to the round containing table T such that row l is accessed. The encoding is removed from this input, to obtain an input to a round of a (non-white-box) implementation of AES. The algorithm outlined in the previous paragraph can now be utilized to derive a data block for which the white-box implementation accesses row l. In general, encodings can be removed from an encoded input to a particular look-up table in a network of look-up tables that causes an access to a row l of that particular look-up table, and the processing may be inverted using a version of the processing algorithm without encodings. The processing steps without encodings may be easier to invert than the encoded look-up tables of the white-box implementation. The encodings can only be removed by a person or system that has knowledge of the encodings, not by an attacker who does not have this knowledge.

It is noted that, instead of deriving a data block that accesses one particular row l of one particular table in the network, a data block can be derived that causes the program to access predetermined entries in each of a plurality of respective look-up tables in the network of look-up tables. A reason for this is that the input bits of a block are distributed over a plurality of tables, therefore it is possible to choose the plurality of bits distributed to each table to access a respective predetermined look-up table entry.

It is also noted that the data blocks that are defined to access particular rows in a round r also access rows in other rounds, as the rounds are part of the network of look-up tables. Some of these additionally accessed rows may also be unified with code. As a result, fewer blocks need to be included to achieve that a certain number of bytes unified with code are accessed by the algorithm.

Besides the CBC modes discussed, a counter (CTR) mode can also be used. In such a mode, the counter (for example a pseudo-random sequence of values) may be encrypted rather than the data itself. The data is XOR'ed with the encrypted counter stream. For this mode, the freedom in choosing counter values can be used to include the desired values (corresponding to the predetermined table look-ups) in the counter stream. For example, a set of counter values may be made to occur near the beginning of the data stream, which will cause a large portion of the unified table entries to be accessed. If the encryption of the counter stream is again performed in the "proposed" CBC mode, then a change in the unified code will be fatal to a processing of a large portion of the data stream. An advantage of using CTR mode here is that there are no superfluous decryptions/encryptions, as the encryption result of the chosen counter values is XOR'ed with encrypted data to obtain valid plaintext.

The method can also be used for validation of a binary image. By quickly accessing all entries in look-up tables, it is quickly verified if the values in the look-up tables are correct. It is not necessary to process real data in addition. First a set of data blocks is derived that enforce that all S-box entries are accessed. This can be done with the algorithm described. Next, for all the data blocks in this set it is tested whether the look-up tables give the correct answer. If this is the case, the binary image is probably correct. When using a cipher-block-chaining mode as explained above, only the last result needs to be verified because it is only correct if all previous operations were correct.

Figure 5:
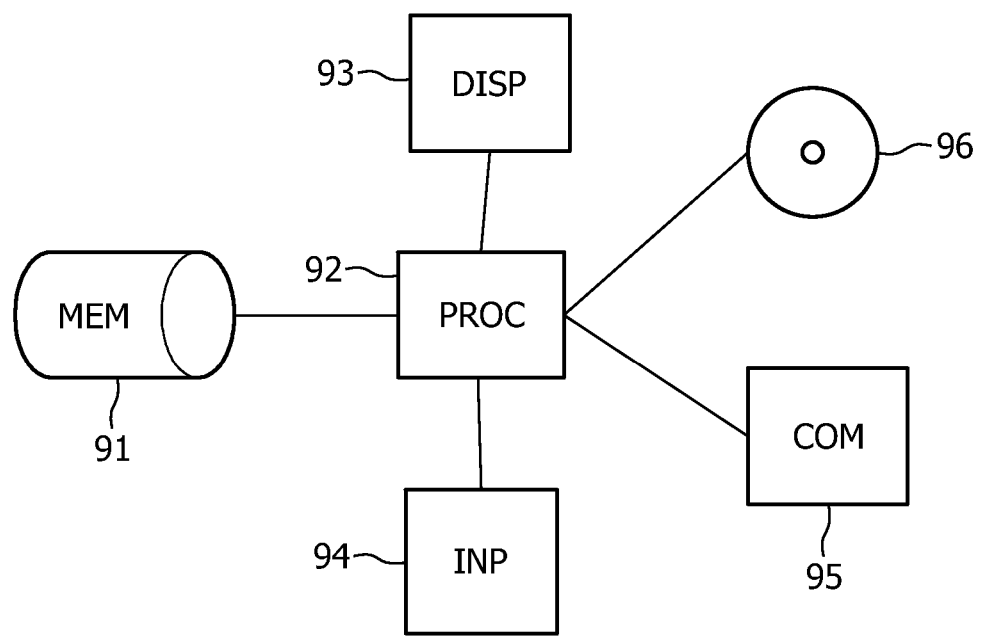
FIG. 5 is a diagram illustrating an embodiment.

FIG. 5 illustrates an embodiment of the invention. The Figure shows a communication port 95 such as a connection to the Internet for connecting with a provider of digital content. The content can also be obtained from medium 96 such as a DVD or CD. Digital content on the PC is typically rendered using media players being executed by processor 92 using memory 91. Such players can execute, for a specific content format, a respective plug-in for performing the format-specific decoding corresponding to content obtained via communication port 95 and/or medium 96. Those content formats may include AVI, DV, Motion JPEG, MPEG-1, MPEG-2, MPEG-4, WMV, Audio CD, MP3, WMA, WAV, AIFF/AIFC, AU, etc. For digital rights management purposes, a secure plug-in may be used that not only decodes the content but also decrypts the content. This plug-in comprises processor instructions and parameters (such as obfuscated look-up tables) stored in memory 91. The processor instructions and parameters may be overlapping as set forth; in that case, some memory locations in memory 91 contain a value representing both processor instruction and parameter value during execution of the plug-in. In the content, data blocks are inserted to make sure that some predefined memory locations are used as look-up table entries during their decoding/decrypting. For example the memory locations representing both processor instruction and parameter value may be addressed. A user input 94 may be provided to obtain commands from a user to indicate content to be rendered, and display 93 and/or speakers are provided for rendering the decoded and/or decrypted content.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier may be any entity or device capable of carrying the program. For example, the carrier may include a storage medium, such as a ROM, for example a CD ROM or a semi-conductor memory, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for increasing a tamper resistance of a digital data processing device, comprising:
   a first processor comprising:
      means for cryptographically processing incoming first digital data using one or more first values looked up in at least one look-up table of look-up tables in a look-up table network, the look-up tables operatively coupling each other;
   a second processor comprising:
      means for computing at least one second value;
      means for inserting the at least one second value into second digital data to from the first digital data, the at least one second value causing the means for cryptographically processing incoming first digital data to look up a predefined entry of the at least one look-up table when processing the first digital data having the at least one second value, and
   a transmitter for transmitting the first digital data having the at least one second value to the first processor; and
      means for verifying the at least one look-up table in the look-up table network of the look-up tables based on the at least one second value inserted into the second digital data by enforcing the means for cryptographically processing incoming first digital data to look up the predefined entry of the at least one look-up table based on the at least one second value inserted into the second digital data and comparing an output of the means for cryptographically processing incoming first digital data with a reference value.

2. The system according to claim 1, wherein:
the means for inserting the at least one second value is arranged for inserting the at least one second value into encrypted content of the second digital data to form the first digital data; and
the means for cryptographically processing incoming first digital data is arranged for decrypting the encrypted content using the one or more first values looked up in the at least one look-up table in the look-up table network based on the at least one second value inserted into the encrypted content.

3. The system according to claim 1, wherein the means for cryptographically processing incoming first digital data is arranged for performing key-based encryption or decryption on the first digital data in a predetermined order, where the one or more first values looked up in the at least one look-up table for the encryption or decryption influence a processing result of data whose processing starts after the look-up operation.

4. The system according to claim 1, wherein the means for inserting the at least one second value is arranged for positioning the at least one second value in the first digital data to cause the means for cryptographically processing incoming first digital data to look up the predefined entry of the at least one look-up table for encryption or decryption before processing a predetermined block of the first digital data.

5. A system for increasing a tamper resistance of a digital data processing device, comprising:
a first processor comprising:
means for cryptographically processing incoming first digital data using one or more first values looked up in at least one look-up table;
a second processor comprising:
means for computing at least one second value,
means for inserting the at least one second value into second digital data to form the first digital data, the at least one second value causing the means for cryptographically processing incoming first digital data to look up at least one predetermined first value in the at least one lookup table when processing the first digital data having the at least one second value, and
a transmitter for transmitting the first digital data having the at least one second value to the first processor;
wherein:
the first processor comprises a memory for storing a bit representation of software to be executed by the first processor at a memory address, the memory address being shared by at least part of the bit representation of the software and the at least one predetermined first value in the at least one look-up table used by the means for cryptographically processing incoming first digital data such that the at least part of the bit representation of the software is equal to the at least one predetermined first value.

6. The system according to claim 5, wherein the at least part of the bit representation of the software contains instructions executed as part of an operation of the means for cryptographically processing incoming first digital data.

7. A system for increasing a tamper resistance of a digital data processing device for cryptographically processing, comprising:
means for computing at least one first value,
means for inserting the at least one first value into first digital data to form second digital data, the at least one first value for verifying a look-up table of look-up tables in a look-up table network, the look-up tables operatively coupling each other, the at least one first value causing the processing device to look up a predefined entry of the at least one look-up table when processing the second digital data having the at least one first value, and
a transmitter for distributing the second digital data having the at least one first value to the processing device to verify the at least one look-up table in the look-up table network of the look-up tables by enforcing the processing device to look up the predefined entry of the at least one look-up table based on the at least one first value inserted in the first digital data and comparing an output of the processing device with a reference value.

8. A method of increasing a tamper resistance of a digital data processing, comprising:
in a first processor:
cryptographically processing incoming first digital data using one or more first values looked up in at least one look-up table of look-up tables in a look-up table network, the look-up tables operatively coupling each other;
in a second processor:
computing at least one second value,
inserting the at least one second value into second digital data to form the first digital data, the at least one second value causing the first processor to look up a predefined entry of the at least one look-up table when processing the first digital data having the at least one second value, and
transmitting the first digital data having the at least one second value to the first processor; and
verifying the at least one look-up table in the look-up table network of the look-up tables based on the at least one second value, including:
enforcing the first processor to look up the predefined entry of the at least one look-up table based on the at ;east one second value inserted into the second digital data, and
comparing an output of the processing of the incoming first digital data with a reference value.

9. A system for increasing a tamper resistance of a digital data processing device, comprising:
means for cryptographically processing first digital data using one or more first values looked up in at least one look-up table;
a memory for storing a bit representation of software to be executed by the means for cryptographically processing first digital data at a memory address, the memory address being shared by at least part of the bit representation of the software and at least part of the at least one look-up table used by the means for cryptographically processing first digital data such that the at least part of the bit representation of the software is equal to the at least part of the at least one look-up table;
where the first digital data contains at least one second value for verifying the at least one look-up table, the at least one second value causing the means for cryptographically processing first digital data to look up a predefined entry of the at least one look-up table when processing the first digital data.

10. A method for increasing a tamper resistance of a digital data processing device, comprising:
- cryptographically processing, by a processor, incoming first digital data using one or more first values looked up in at least one look-up table based on at least one second value in the first digital data;
- storing in a memory a bit representation of software to be executed by the processor at a memory address, the memory address being shared by at least part of the bit representation of the software and at least part of the at least one look-up table used by the processor such that the at least part of the bit representation of the software is equal to the at least part of the at least one look-up table;
- where the first digital data contains at least one second value for verifying the at least one look-up table, the at least one second value causing the processor to look up a predefined entry of the at least one look-up table when processing the first digital data.

11. The system according to claim 1, wherein the at least one look-up table contains at least part of a bit representation of software to be executed by the processor.

12. The system according to claim 1, wherein the at least one second value is computed so the white-box implementation accesses a selected row in the at least one look-up table.

13. The method according to claim 10, comprising:
- selecting the at least part of the bit representation of the software and creating the at least one look-up table containing the selected at least part of the bit representation of the software.

14. The method according to claim 10, comprising:
- deriving the at least one second value for which white-box implementation accesses a selected row in the at least one look-up table.

15. The method according to claim 8, comprising:
- storing a bit representation of software to be executed by the first processor at a memory address in a memory, the memory address being shared by at least part of the bit representation of the software and the at least one predefined entry of the at least one look-up table such that the at least part of the bit representation of the software is equal to the bit representation of the at least one predefined entry of the at least one look-up table.

16. The method according to claim 10, wherein the at least part of the bit representation of the software comprises string of bits in an operating system or a driver of the system.

17. The method according to claim 10, comprising:
- inserting the at least one second value into second digital data to form the first digital data to be processed in the processor; and
- enforcing the processing device to look up the predefined entry of the at least one look-up table based on the at least one second value in the first digital data and comparing an output of the processor with a reference value.

* * * * *